Figure 2A:
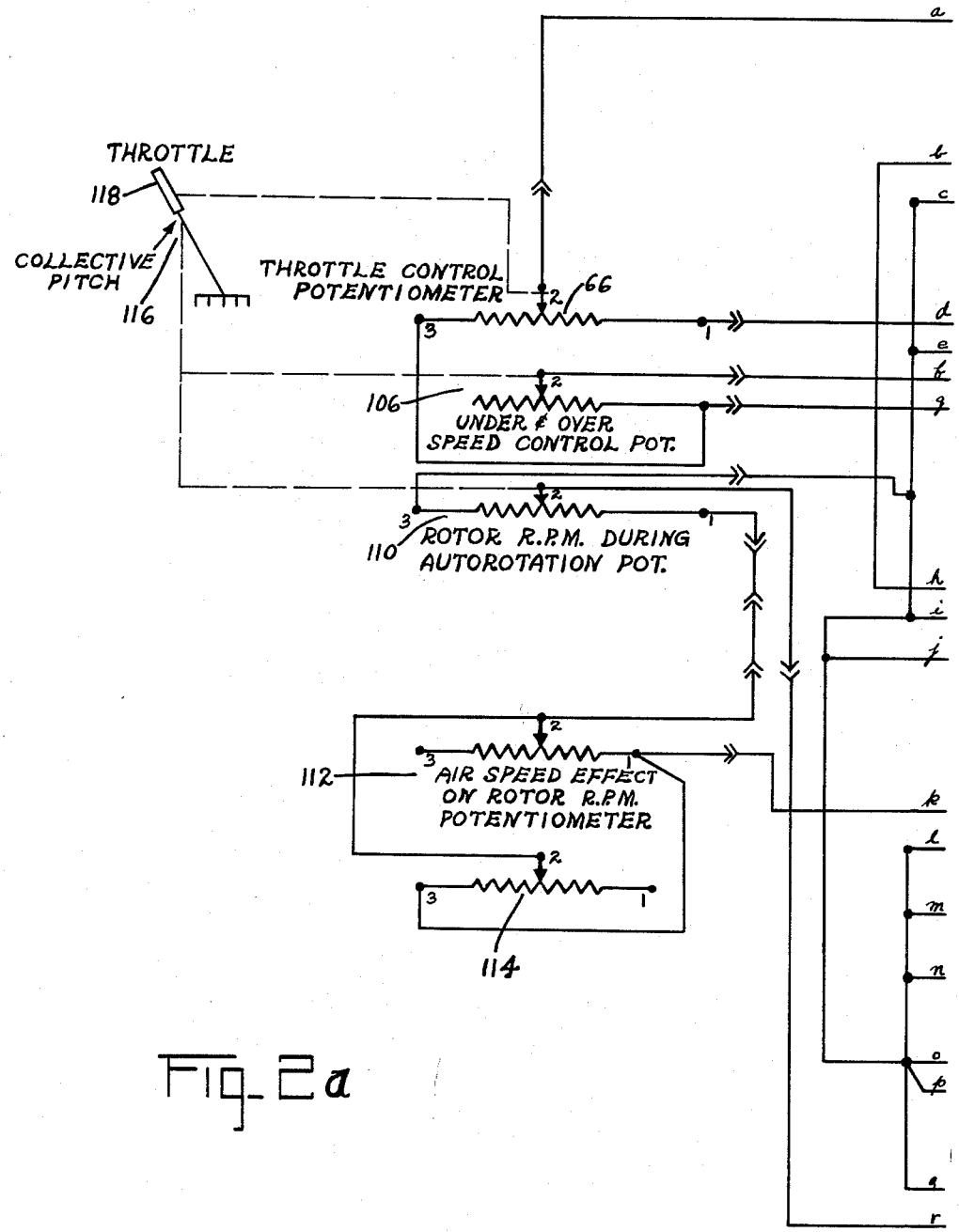
Figure 2B:
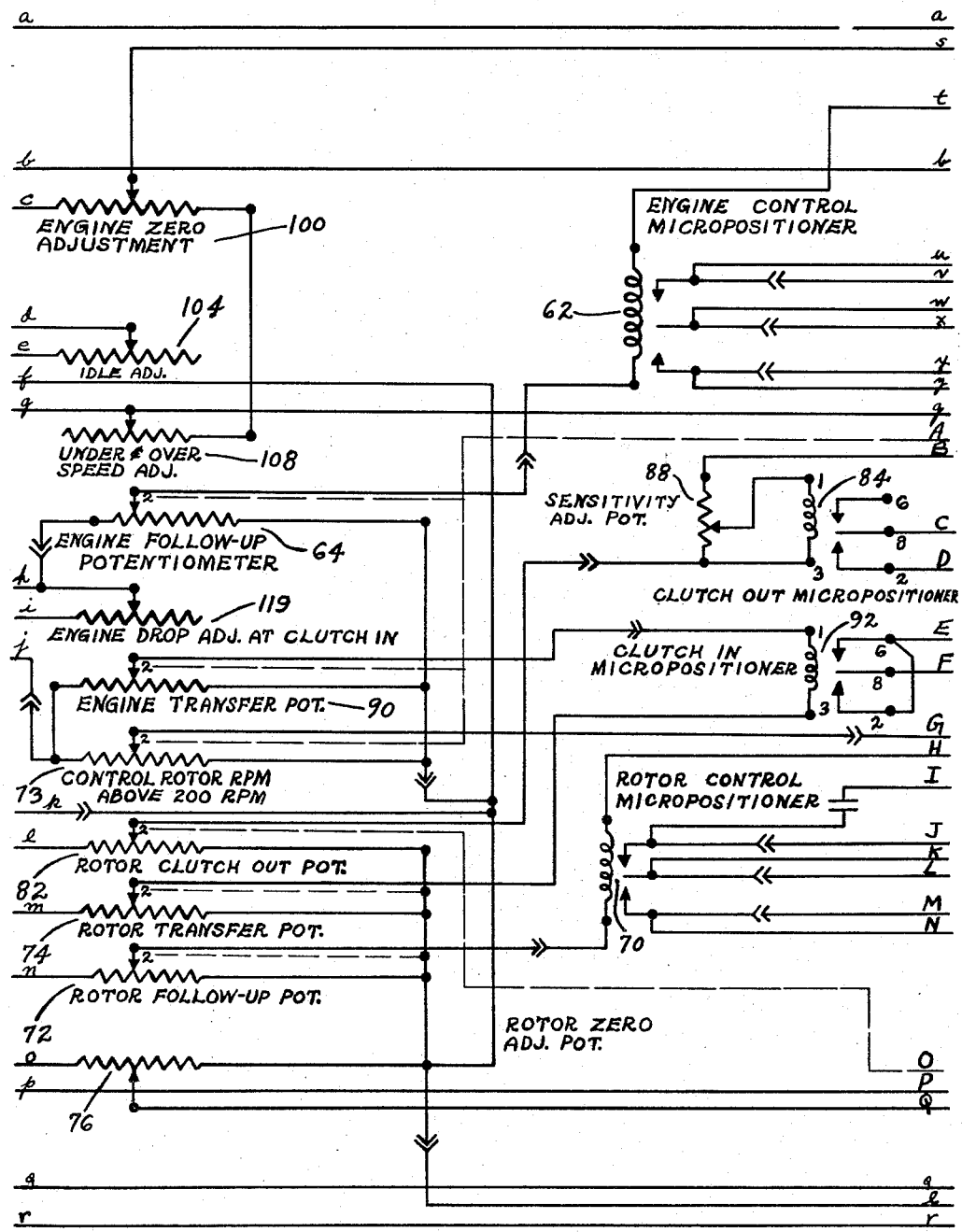
Figure 2D:
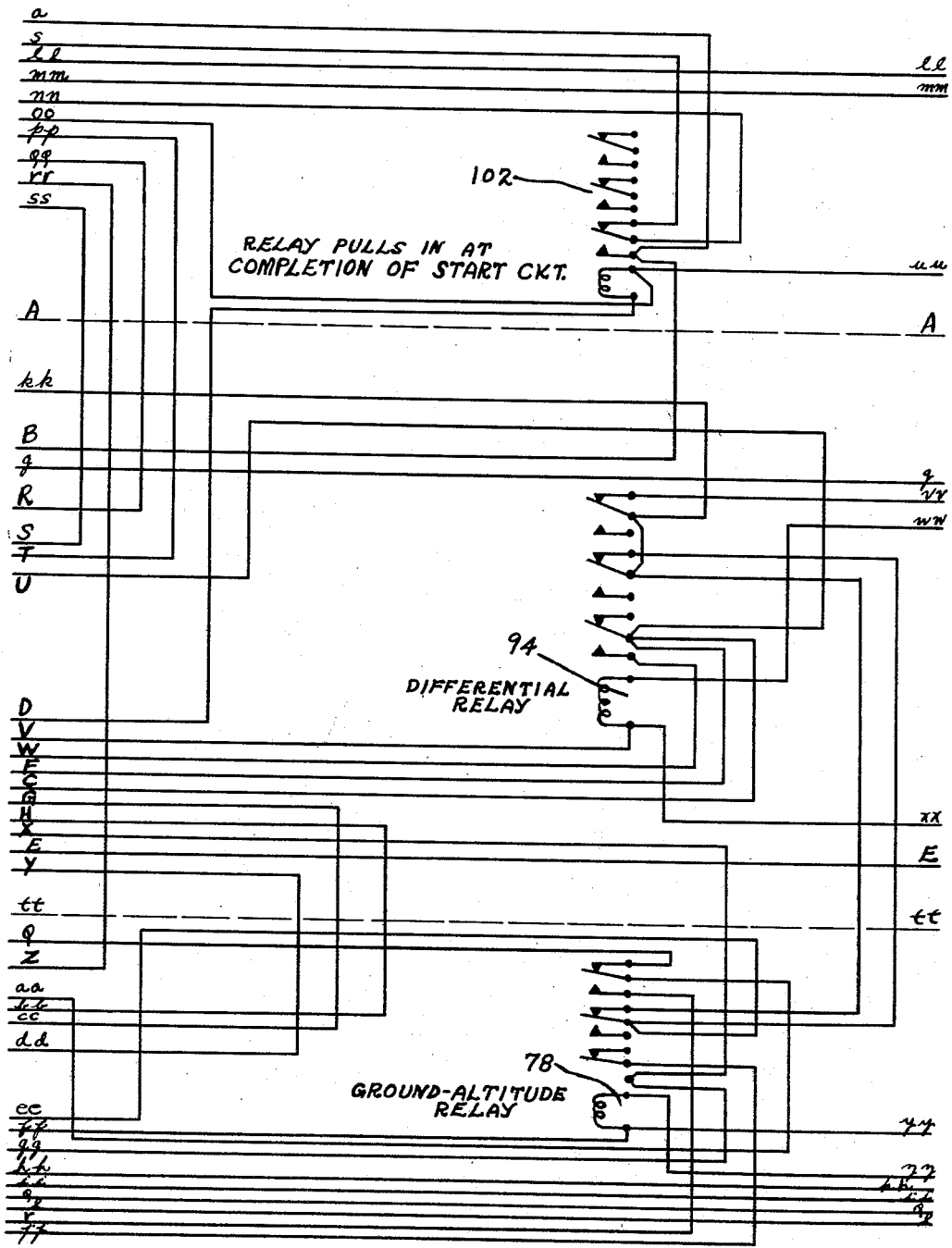

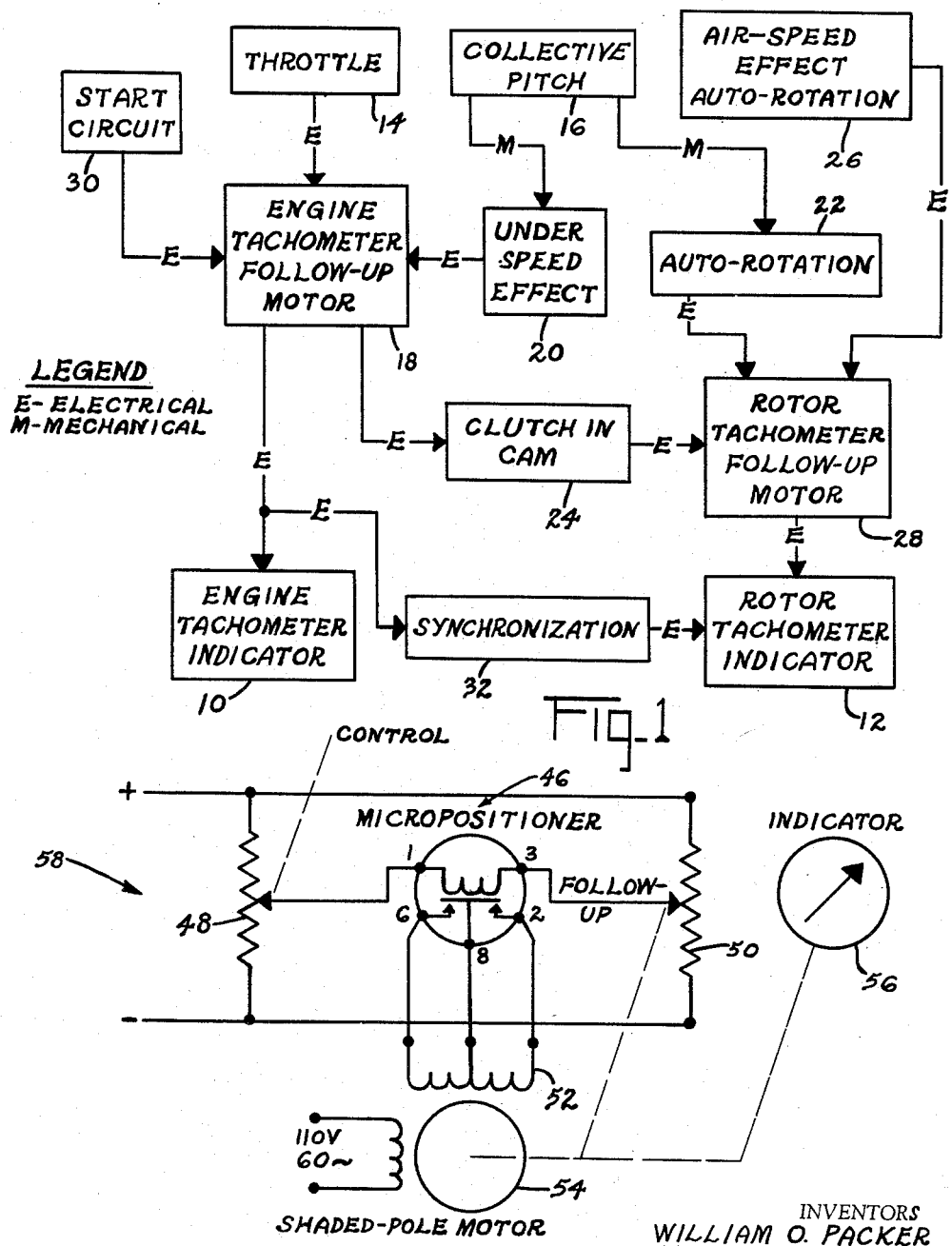

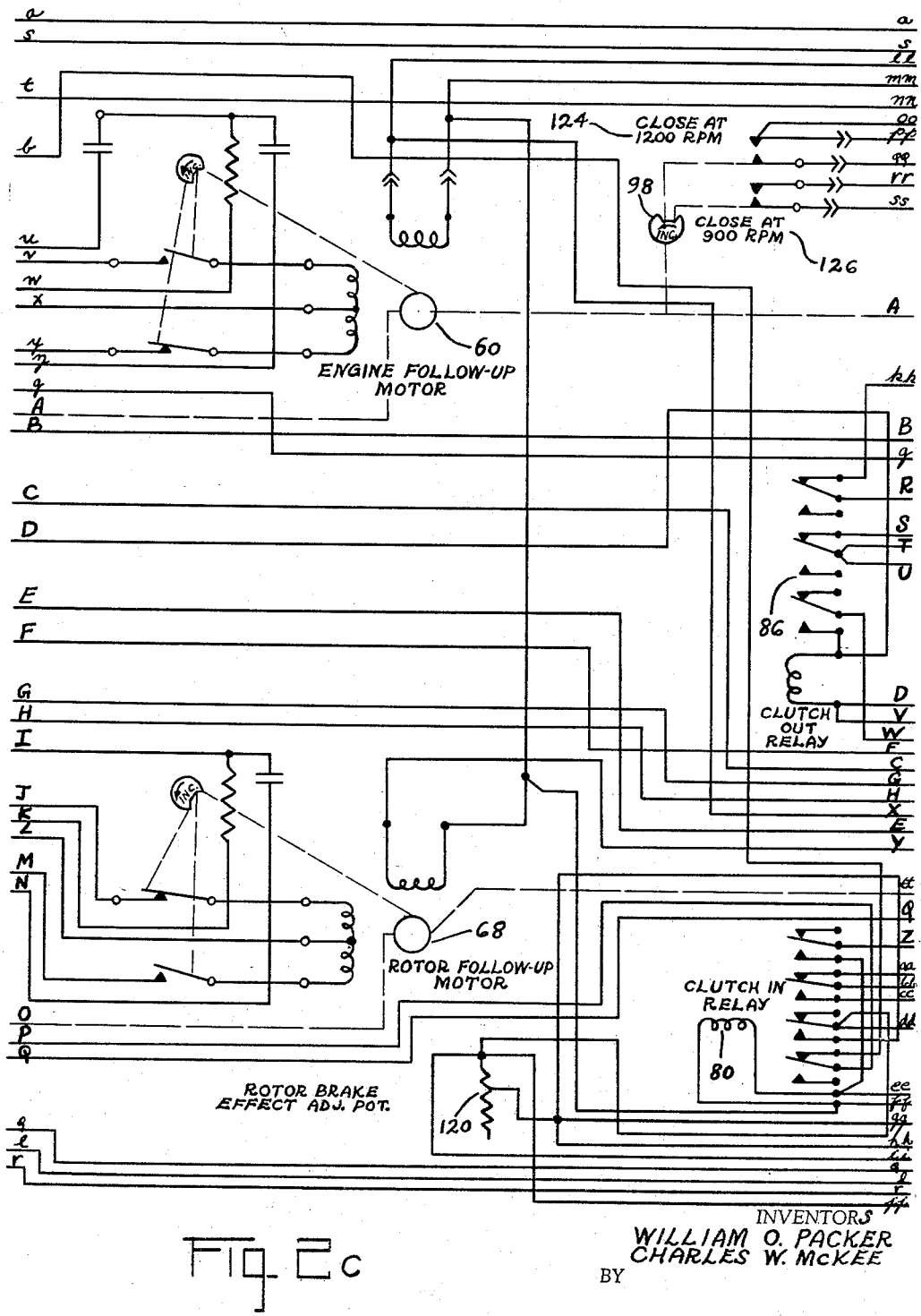

United States Patent Office 3,001,299
Patented Sept. 26, 1961

3,001,299
HELICOPTER-DUAL TACHOMETER SYSTEM TRAINING DEVICE
William O. Packer, Silver Spring, Md., and Charles W. McKee, Buffalo, N.Y., assignors, by mesne assignments, to the United States of America as represented by the Secretary of the Navy
Filed May 11, 1960, Ser. No. 28,503
4 Claims. (Cl. 35—12)

This invention relates to apparatus for training students in the operation of aircraft and is particularly directed to a ground based helicopter flight trainer which is designed to realistically simulate the controls and operations of a helicopter during flight.

Helicopter simulators in use prior to the instant invention were capable of simulating engine speed only. To achieve a more realistic simulation, it was necessary to indicate main rotor speed as well as engine speed. The dual tachometer simulation of the invention overcomes the deficiency of the prior art.

The principal object of the invention is to simulate the engine and rotor speeds of a helicopter in a ground based trainer to provide a realistic duplication of the sounds produced by an operational helicopter.

Another object of the invention is to simulate the effects of normal and abnormal operating conditions on the engine and rotor speeds indications of a ground based helicopter trainer.

A further object of this invention is to provide simplified circuits for simulating the tachometer system of a helicopter.

It is a feature of the invention to simulate changes in rotor and engine speed which occurs due to the airload of the rotor system.

It is another feature to simulate the reaction of the engine when the load is clutched-in by reducing the engine r.p.m.

It is yet another feature to simulate the engine r.p.m. by means of a cam controlled switch.

It is another feature to simulate engine failure occurring on the ground whereby autorotation will not occur and the rotor coasts gradually to rest where the brake is applied.

It is yet another feature to synchronize the rotor and teletorque tachometer indications by causing the engine transmitter to drive the two indicators.

Other objects and many of the attendant advantages of this invention will be readily appreciated as the same becomes better understood by reference to the following detailed description when considered in connection with the accompanying drawings wherein:

FIGURE 1 is a block diagrammatic view showing the relationships of most of the important parts of the invention, FIGURES 2a through 2f constitute a detailed schematic view of the invention, and FIGURE 3 is a detailed schematic view of the followup circuits which form an important part of the invention.

With reference to FIGURE 1, indications of rotor and engine r.p.m. of the simulated engine and rotor are provided by dual tachometers on the pilot's instrument panel and the operator's remote instrument case. The tachometer unit is located in the nose of the trainer mounted on top of the rudder support (not shown). The tachometer system can be adjusted with the panels in place in the trainer. The engine tachometer indicator 10 and the rotor tachometer indicator 12 have concentric scales and are controlled through the action of the throttle control 14 and the collective pitch stick 16. The throttle is electrically connected to the engine tachometer followup motor 18. The collective pitch control stick 16 is mechanically connected to both the underspeed effect circuit 20 and the autorotation circuit 22, while the underspeed effect circuit 20 is electrically connected to the engine tachometer followup motor 18. This engine tachometer followup motor 18 is electrically connected to and controls the engine tachometer indicator 10, and is also electrically connected to the clutch-in arm 24. The clutch-in cam 24, the autorotation circuit 22 and the air speed effect autorotation circuit 26 are all electrically connected to the rotor tachometer followup motor 28. This rotor tachometer followup motor electrically controls the rotor tachometer indicator 12.

The start circuit 30 comprises time delay circuits which simulate the actual starting circuit of a helicopter. The sequence of operation is as follows: The start circuit 30 causes the engine tachometer followup motor 18 to revolve. The tachometer indicator 10 will indicate the idling r.p.m. of 800. Operation of the throttle control 14 to increase the speed results in an increase of engine tachometer speed to 1200 r.p.m. At this point engagement of the rotor clutch is simulated by operation of the clutch-in cam circuit 24. This causes a cam 98 (see FIGURE 2c) in the engine followup motor 18 to operate a switch 124 which disconnects the rotor input bridge from the circuit that held it at zero to be connected to and drive the rotor tachometer followup motor 28. The engine r.p.m. is reduced by this clutch-in, thereby simulating the reaction of the engine when the load is clutched in.

Because of the airload on the rotor system, an increase of rotor pitch from minimum to maximum will cause a loss of about 15 rotor r.p.m. and an equivalent loss of engine r.p.m. unless the throttle is advanced. Similarly, a decrease of rotor pitch from maximum to minimum will cause the engine and rotor to overspeed unless the throttle is retarded. To simulate this behavior the underspeed effect circuit 20 has been inserted between the collective pitch stick 16 and engine tachometer followup motor 18. This underspeed effect circuit 20 is controlled by any change in the rotor pitch control, and controls the speed of the engine tachometer followup motor 18.

In order to accurately simulate the rotor and teletorque tachometer indications after clutch-in, and to prevent minor variations between the two caused by the two followup motors, the rotor tachometer is switched to the engine tachometer followup motor by synchronization circuit 32. Thus, as long as both tachometers are approximately equivalent, the engine tachometer followup motor drives the two indicators. If the ignition switch is cut or the throttle reduced to idle, the rotor indicator is automatically switched back to the engine tachometer followup motor.

If an engine failure occurs on the ground, autorotation does not occur and the rotor coasts gradually to rest. This condition is simulated by the underspeed effect circuit 20 and the autorotation circuit 22. When an engine failure on the ground is simulated, the engine followup motor 18 stops and the rotor tachometer motor 28 coasts gradually to rest.

After takeoff, the autorotation circuits are placed in readiness. While engine operation is normal, the autorotation circuit has no effect. If the engine fails or voluntary autorotation is desired, the engine r.p.m. will drop to zero or idle, thereby declutching the rotor.

This is simulated by the air speed effect autorotation circuit 26. If the engine is restarted during autorotation, the input to the rotor tachometer followup motor 28 continues from the collective pitch circuit 16 and the air speed effect autorotation circuit 26, until the engine r.p.m. is synchronized with the rotor spin. At this point the synchronization circuit 32 switches the rotor tachometer indicator 12 back to the engine tachometer followup motor 18.

Figure 2E:
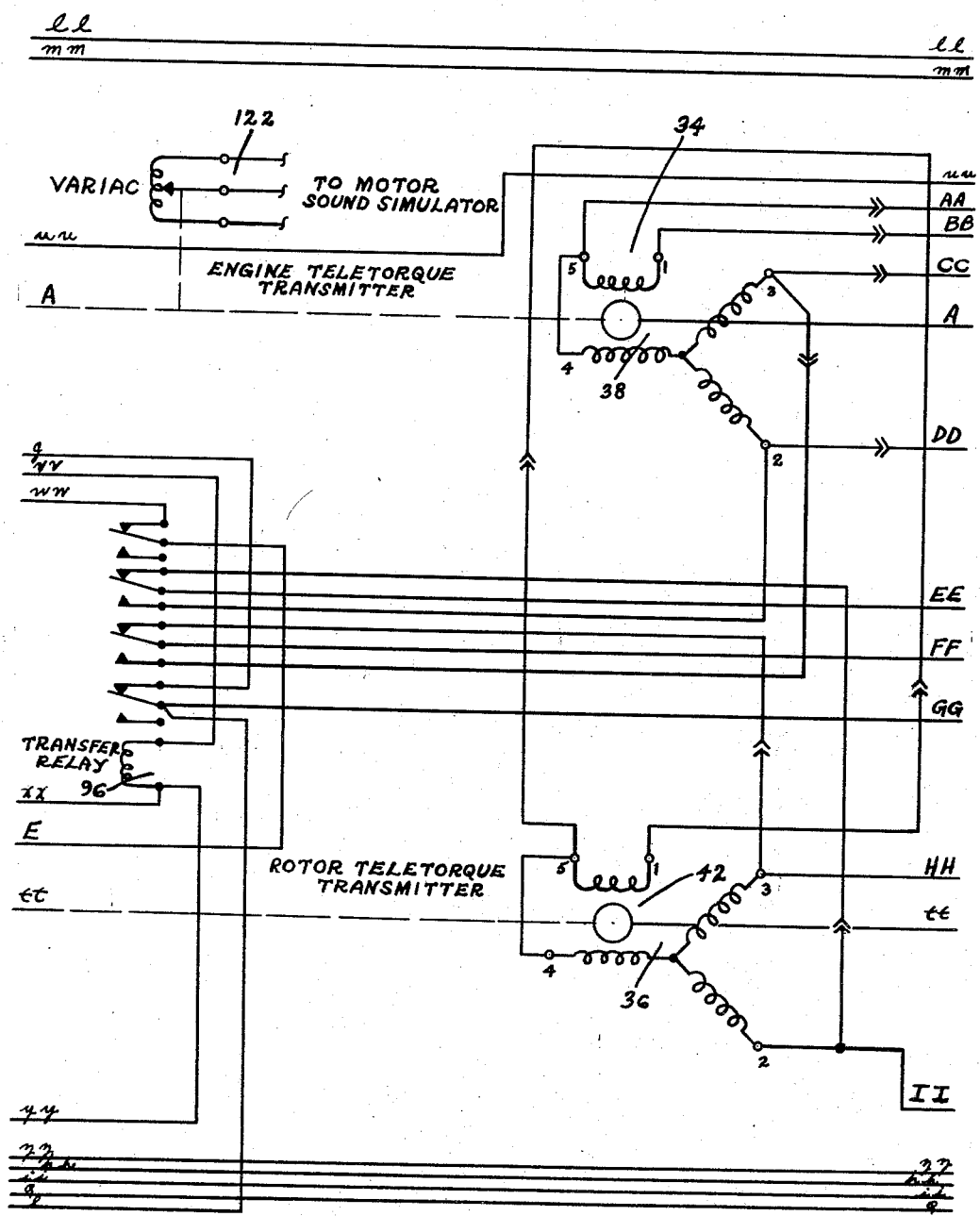
Figure 2F:
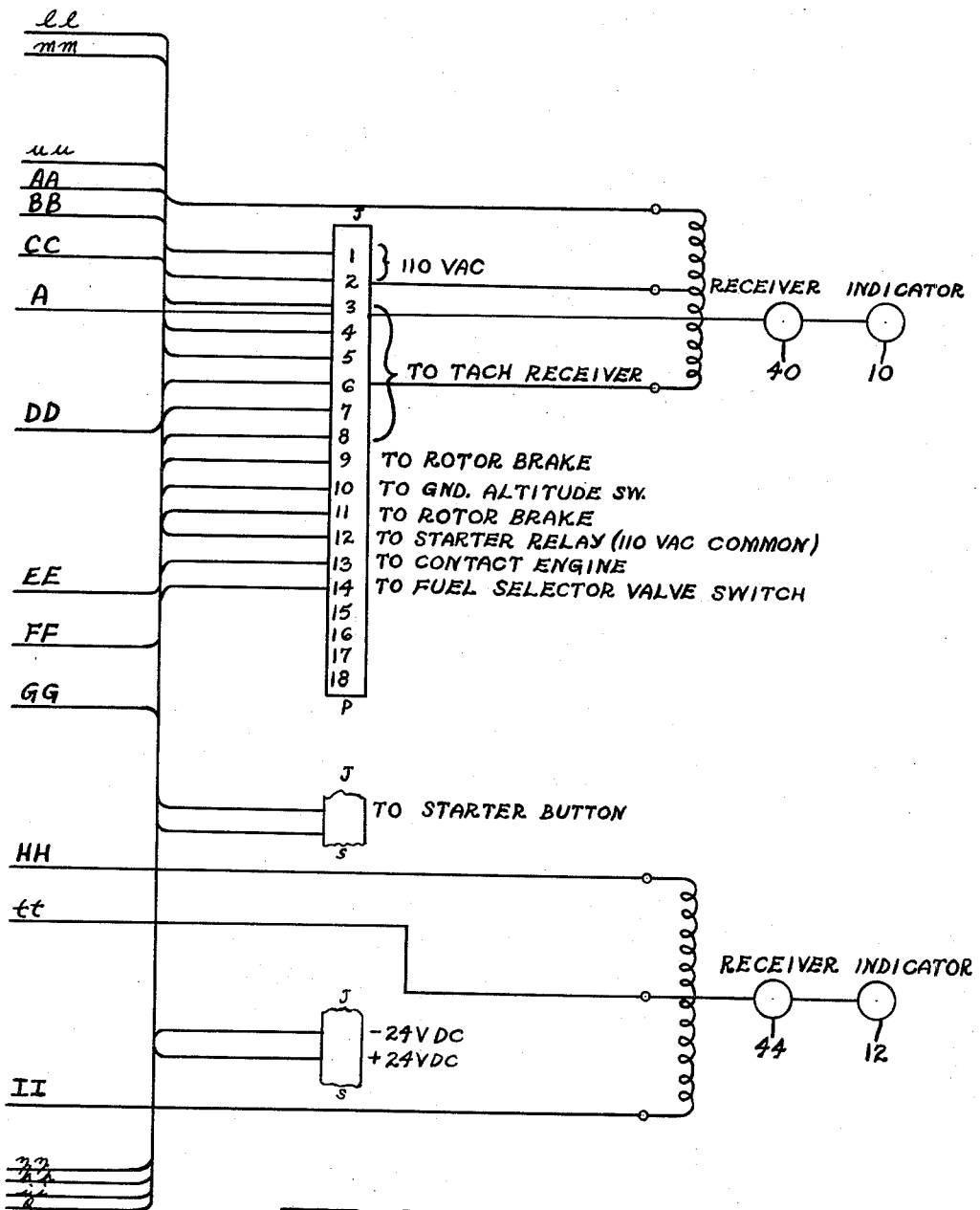

As shown in FIGURE 2e, the indication of rotor and engine r.p.m. are respectively operated by dual teletorques 34 and 36. Each teletorque comprises a transmitter and a receiver which are electrically interconnected. The engine teletorque 34 comprises transmitter 38 and receiver 40. Engine tachometer indicator 10 is mechanically linked to the teletorque receiver 40. Rotor tachometer indicator 12 is mechanically linked to the teletorque receiver 44. The engine and rotor tachometer teletorque transmitters 38 and 42 respectively are driven by separate servo systems, each such system comprising a micropositioner, two potentiometers and an actuator.

The servo circuit is illustrated in FIGURE 3. The micropositioner 46 is connected between the movable arms of the control potentiometer 48 and the followup potentiometer 50. The micropositioner is a direct current single coil voltage sensitive relay. Two permanent magnets are used for the polarizing field. The corresponding resistive terminals of the control and followup potentiometers 48 and 50 are connected in parallel. The control winding 52 of shaded pole motor 54 is operatively connected across the terminals of the micropositioner. The rotor of this motor 54 is mechanically coupled to the movable arm of the followup potentiometer 50 and to the indicator 56. A plus and minus operating voltage 58 is connected to the respective ends of the parallel connected potentiometers 48 and 50.

In operation, the position of the control potentiometer 48 is controlled manually or externally. If the control potentiometer 48 is at the same position as the followup potentiometer 50, there is no voltage across the coil of the micropositioner 46 and the armature assumes a neutral (open) position. If, however, the position of the control potentiometer 48 is altered so that either a more positive or negative voltage is on the movable arm of the control potentiometer 48 than on the movable arm of the followup potentiometer 50, the armature of the micropositioner will close in a direction corresponding to the greater negative or positive voltage, thereby causing the rotor 54 of the followup motor to turn in a direction corresponding to the polarity of the greater voltage, thereby moving the movable arm of followup potentiometer 50 to zero the voltage across the coil of the micropositioner 46.

Thus, it is seen that the micropositioner coil and the two potentiometers form a bridge circuit with the two potentiometers 50 and 48 forming the four arms of the bridge and the coil of the micropositioner 46 forming the crossarm. Two separate bridge circuits of this type are used for the rotor and the engine simulation circuits. The engine indicator bridge circuit comprises the engine followup motor 60, engine control micropositioner 62, engine followup potentiometer 64 and throttle control potentiometer 66. The rotor indicator bridge circuit comprises the rotor followup motor 68, the rotor control micropositioner 70, the rotor followup potentiometer 72 and the control rotor potentiometer 73.

A rotor zero adjustment potentiometer 76 which has its resistance terminals connected across the rotor transfer and followup potentiometers 74 and 72 respectively, is also contained in the rotor speed simulation circuit. The movable arm of the rotor zero adjustment potentiometer is connected through contacts of ground altitude relay 78 and contacts of clutch-in relay 80 to the coil of rotor control micropositioner 70.

The movable arm of the rotor clutch-out potentiometer 82 is connected to the coil of the clutch-out micropositioner 84. The clutch-out micropositioner 84 is connected to the coil of clutch-out relay 86. Sensitivity adjustment potentiometer 88 which is connected across the coil of the clutch-out micropositioner 84 is used to adjust the sensitivity of the clutch-out simulation speed point. The rotor clutch-out potentiometer 82, the rotor transfer potentiometer 74 and the rotor followup potentiometer 72 are ganged together and mechanically coupled to the rotor followup motor. The rotor control potentiometer 73, the engine transfer potentiometer 90 and the engine followup potentiometer are ganged together and mechanically coupled to the engine followup motor 60. The engine transfer potentiometer 90 and the rotor transfer potentiometer 74 are respectively connected to either side of the clutch-in micropositioner coil 92. The clutch-in micropositioner 92 actuates a differential relay 94 through contacts of transfer relay 96. Differential relay 94 is therefore actuated for any difference between the simulated rotor and engine speeds.

Engine zero-adjustment potentiometer 100 is connected to the engine control micropositioner 62 through contacts of start circuit, pull-in relay 102. This engine zero-adjustment relay 102 is used to zero the voltages applied to the engine control micropositioner 62 prior to energizing the start circuit. An idle-adjustment potentiometer 104 is connected in series with the throttle control potentiometer 66 for adjustment of the simulated idling speed. The under and over speed control potentiometer 106 is connected to one side of the engine zero adjustment potentiometer 100 in order to simulate under and over speed conditions. An under and over speed adjustment potentiometer 108 is connected in series with the under and over speed control potentiometer 106 for fine adjustments. A rotor revolutions-per-minute during-autorotation-potentiometer 110 is connected to the coil of the rotor control micropositioner 70 through contacts of the ground altitude relay 78 and the clutch-in relay 80. An air speed effect on rotor revolutions-per-minute potentiometer 112, is connected in series with the rotor-revolutions-per-minute during autorotation potentiometer 110. A fine adjustment potentiometer 114 is connected in parallel with the air speed effect on rotor revolutions-per-minute potentiometer 112.

The under and over speed control potentiometer 106 and the rotor revolutions-per-minute during autorotation potentiometer 110 are ganged together and mechanically linked to the collective pitch control 116 of the trainer. The throttle control 118 of the trainer controls the throttle control potentiometer 66. An engine drop adjustment at clutch-in potentiometer 119 is provided to adjust the simulated engine speed indication when the rotor is clutched in.

A rotor brake effect adjustment potentiometer 120 is provided to place resistance in the rotor revolutions-per-minute circuit to simulate rotor braking. A sound simulator which is controlled by variac 122 simulates the motor noise in direct proportion to the simulated motor speed. The sound simulator variac is mechanically linked to the engine followup motor 60.

The table on the following page gives the interconnections for energized and de-energized positions of the relays.

| RELAY | | ARM 1 | | ARM 2 | | ARM 3 | | ARM 4 | |
|---|---|---|---|---|---|---|---|---|---|
| Name | Attitude | From | To | From | To | From | To | From | To |
| Clutch-in Relay (80). | De-energized. | Motor Speed Switch (98). | N.C. | Coil of Rotor Control Micropositioner (70). | Arm 1 of Ground-Altitude Relay (78). | Rotor Followup Motor (68). | N.C. | −24 VDC | Engine Followup Potentiometer (64). |
| | Energized | Same as above. | Coil of Relay (80) and Arm 2 of Ground-Altitude Relay (78) and De-energized Arm 2 of Differential Relay (94). | Same as above. | Variable Arm of Rotor Control Potentiometer (73). | Same as above. | Rotor Brake Effect Adjustment Potentiometer (120). | Same as above. | N.C. |
| Clutch-out Relay (86). | De-energized. | Close at 1200 r.p.m. Switch (124). | Arms 1 and 2 of Differential Relay 94 and De-energized Contact 2 of Ground-Altitude Relay (78). | 110 VAC Common. | Close at 900 r.p.m. Switch (126). | Energized Contact 3 of Differential Relay (94). | N.C. | | |
| | Energized | Same as above. | N.C. | Same as above. | N.C. | Same as above. | Coil of Clutch-out Relay (86). | | |
| Ground-Altitude Relay (78). | De-energized. | De-energized Contact 2 of Clutch-in Relay (80). | Rotor Zero Adjustment Potentiometer (76). | 110 VAC Common from De-energized Contact 2 of Differential Relay (94). | Arm 2 of Differential Relay (94). | Rotor Brake Effect Adjustment Potentiometer (120). | N.C. | | |
| | Energized | Same as above. | Rotor r.p.m. During Auto-Rotation. | Same as above. | N.C. | Same as above. | To Rotor Brake Effect Adjustment Potentiometer (120) and Engine Follow-up Motor (60). | | |
| Differential Relay (94). | De-energized. | Arm 2 of same Relay (94) and De-energized Contact 1 of Clutch-out Relay (86). | Coil of Transfer Relay (96). | Arm 1 of same Relay (94) and De-energized Contact 2 of Ground-Altitude Relay (78). | Arm 2 of Ground-Altitude Relay (78) and coil of Clutch-in Relay (80). | Arm 2 of Clutch-out Relay (86) and Clutch-out Micro-positioner (84) and Clutch-in Positioner (92). | N.C. | | |
| | Energized | Same as above. | N.C. | Same as above. | | Same as above. | Arm 3 of Clutch-out Relay (86). | | |
| Start Circuit Relay (102). | De-energized. | N.C. | N.C. | N.C. | N.C. | Engine Control Micro-positioner (62). | Engine Zero Adjustment Potentiometer (100). | | |
| | Energized | N.C. | N.C. | N.C. | N.C. | Same as above. | Throttle Control Potentiometer (66) and Clutch-out Sensitivity Adjustment Potentiometer (88). | | |
| Transfer Relay (96). | De-energized. | Clutch-in Micro-positioner (92). | Coil of Differential Relay (94). | Tachometer Receivers (40) and (44). | Rotor Teletorque Transmitter (42). | Tachometer Receivers (40) and (44). | Rotor Teletorque Transmitter (42). | +24 VDC | Under and Over Speed Adjustment Potentiometer (108). |
| | Energized | Same as above. | N.C. | Same as above. | Rotor Teletorque Receiver (38). | Same as above. | Rotor Teletorque Receiver (38). | Same as above. | N.C. |

N.C.=No Connection.

In order to simplify the following description of the circuit, the control side of the bridge circuit will be referred to as the throttle side and the follow-up side of the bridge circuit will be referred to as the tachometer side. The simulated ignition switch is held closed for at least five seconds. This connects through a time delay relay a small fixed resistance in series with the throttle side of the engine bridge circuit. This causes the engine follow-up motor to revolve, moving the engine tachometer transmitter 38, the engine or input side of the rotor servo bridge (at present disconnected), and the engine follow-up potentiometer wiper 64 until the bridge is again balanced. At this point the engine tachometer indicator 10 will read 800, the correct idling r.p.m. A further increase in the throttle setting 118, will cause the r.p.m. to increase to about 1,200 r.p.m. At this point the rotor clutch engages. To simulate this, a cam 124 on the engine follow-up motor operates a switch which disconnects the rotor input bridge from the circuit which held it at zero r.p.m. and connects it to the potentiometer driven by the engine follow-up motor. Cam 98 will close contacts 126 above a simulated speed of 900 r.p.m. thereby applying voltage to the coil of clutch-in relay 80 to keep this relay latched at speeds above 900 r.p.m.

After the rotor input bridge has been switched to the potentiometer 73 driven by the engine follow-up motor 60, the rotor follow-up motor drives the rotor tachometer 42, the rotor clutch-out potentiometer 82, the rotor transfer potentiometer 74 and the rotor follow-up potentiometer 72. The rotor follow-up motor 68 will continue to operate until the rotor bridge is balanced.

Because of the air load on the rotor system an increase in rotor pitch from minimum to maximum causes a loss of about 15 rotor r.p.m. and an equivalent loss of engine r.p.m. unless the throttle is advanced. Similarly the decrease of rotor pitch from maximum to minimum causes the engine rotor to overspeed unless the throttle is retarded. To simulate this behavior another potentiometer has been added in series to the throttle side of the engine tachometer bridge. This potentiometer which is the rotor under and over speed control potentiometer 106, is controlled by the rotor pitch control (collective pitch stick) 116. Any change in rotor pitch control causes a change of electrical potential on the wiper of the throttle potentiometer of the engine bridge. In order to simulate accurately the rotor and teletorque tachometer indications after clutch-in and to prevent minor variations between the two caused by the two follow-up motors, the rotor tachometer receiver 44 is switched from the rotor tachometer transmitter 42 to the engine transmitter 38. Thus, as long as both tachometers are approximately equivalent in speed, the engine tachometer transmitter drives the two indicators. If the ignition switch is turned off or the throttle 118 is reduced to idle, the rotor indicator 12 is automatically switched back to the rotor transmitter. To accomplish this simulation two teletorques are used, on driven by the engine follow-up motor 60 and one by the rotor follow-up motor 68. The engine and rotor follow-up motors respectively drive engine and rotor transfer potentiometers 90 and 74. The wipers on these potentiometers are attached to each side of a clutch-in micro-positioner 92. When the voltage between the two is zero and the micropositioner is open the rotor indicator is switched to the transmitter teletorque. If the r.p.m.'s differ, the voltage difference causes one side of the micropositioner to close and the motor indicator is switched back to the rotor tachometer transmitter.

If an engine failure occurs on the ground, autorotation does not occur and the rotor coasts gradually to rest where the brake is applied. To simulate this condition the idle and collective pitch (overspeed-underspeed) control 116 and potentiometer 106 are removed from the circuit and the ignition switch shorts out the throttle potentiometers 66 causing the engine r.p.m. to return to zero. Resistance 120 is placed in series with the rotor follow-up motor causing the rotor r.p.m. to decrease more slowly than normal. If the rotor brake is applied, the brake switch shorts out the resistance 120 causing the rotor r.p.m. to decrease normally to zero. After the engine failure when the switch is placed in a normal position, the simulation circuit is ready for a normal start.

After takeoff, a ground altitude relay 78 closes, placing the autorotation circuit in readiness. While the engine is in normal operation the autorotation circuit is kept open and has no effect. If the engine fails or voluntarily autorotation is desired, the engine r.p.m. will drop to zero or idle, thereby declutching the rotor. When this occurs, the input or engine side of the rotor tachometer bridge is opened. The input side of the rotor bridge is then controlled by two potentiometers in series. One controlled by the rotor pitch control 116 and called the rotor r.p.m. during autorotation potentiometer 110, and the other being the air speed effect on the rotor r.p.m. potentiometer 112. On landing the ground altitude relay 78 opens and the normal engine shutdown or failure on this ground sequence is followed. If the engine is restarted during autorotation, the rotor tachometer input continues from the collective pitch control 116 and air speed potentiometer 112 until the engine r.p.m. is synchronized with the rotor r.p.m. At this point the synchronization circuit described above switches the rotor tachometer back to the engine r.p.m. transmitter.

Obviously many modifications and variations of the present invention are possible in the light of the above teachings. It is therefore to be understood that within the scope of the appended claims the invention may be practiced otherwise than as specifically described.

What is claimed is:

1. A system on a ground-based trainer for presenting a visual indication of a shaft position comprising a manually operated shaft, a first potentiometer, a second potentiometer, connected in parallel with said first potentiometer to form a bridge circuit, control voltages connected across the resistive portions of said potentiometers, a micropositioner connecting the movable contacts of said potentiometers, said shaft being operatively connected to the movable contact of said first potentiometer, a follow-up motor operatively connected to the movable contact of said second potentiometer, driving voltages connected to said follow-up motor, said micropositioner being connected to the follow-up motor to drive said motor to a position whereby the movable contact of said second potentiometer is in accordance with the position of said shaft and said first potentiometer, and said follow-up motor being operatively coupled to a visual indicator.

2. A dual tachometer indicator simulation system comprising a time delay relay, an ignition switch series coupled to said relay, a first potentiometer, a second potentiometer in parallel with said first potentiometer to form a first bridge circuit, a first micropositioner connecting the movable contacts of said potentiometers, a fixed impedance interposed between said time delay relay and said first potentiometer, a first motor fed by said first micropositioner and coupled to said second potentiometer, a first tachometer coupled to said first motor, a third potentiometer coupled to said time delay relay, a fourth potentiometer in parallel with said third potentiometer to form a second bridge circuit, a second micropositioner connecting the movable contacts of said third and fourth potentiometers, a second control fed by said second micropositioner, a second tachometer coupled to said second motor, impedance means coupled to said second motor, shaft means coupled to said first and third mentioned potentiometers, control means connected to said second and fourth potentiometers, control voltages connected across the resistor portions of said potentiometers, and said driving voltages operatively connected to said motors and tachometers, said tachometers being operatively coupled to a visual indicator, and sound simulation means operatively connected to said first motor.

3. The structure of claim 2 and over and under speed simulation means operatively connected to said first bridge circuit.

4. The structure of claim 3 and synchronization means and fail-safe simulation means operatively connected to said first and second bridge circuits.

References Cited in the file of this patent

UNITED STATES PATENTS

| | | |
|---|---|---|
| 2,804,264 | Stern | Aug. 27, 1957 |
| 2,885,792 | Hemstreet | May 12, 1959 |